US007130401B2

(12) United States Patent
Rampey et al.

(10) Patent No.: US 7,130,401 B2
(45) Date of Patent: Oct. 31, 2006

(54) SPEECH TO TEXT CONVERSION SYSTEM (75) Inventors: Fred D. Rampey, Fort Collins, CO (US); James M. MacMillan, Parker, CO (US)

(73) Assignee: Discernix, Incorporated, Fort Collins, CO (US)

( * ) Notice: Subject to any disclaimer, the term of this patent is extended or adjusted under 35 U.S.C. 154(b) by 168 days.

(21) Appl. No.: 10/797,887

(22) Filed: Mar. 9, 2004

(65) Prior Publication Data

US 2005/0201540 A1  Sep. 15, 2005

(51) Int. Cl.
H04M 1/56 (2006.01)
H04M 15/06 (2006.01)
H04M 11/00 (2006.01)
H04M 3/42 (2006.01)
H04L 29/08 (2006.01)

(52) U.S. Cl. .................. 379/142.14; 379/142.05; 379/142.06; 379/88.14; 455/414.4; 455/415

(58) Field of Classification Search .......... 379/142.01, 379/142.04, 142.05, 142.06, 142.07, 142.14, 379/93.23, 93.24, 88.01, 88.11, 88.13, 88.14, 379/88.19, 88.2, 88.21; 455/414.4, 415, 455/556.2, 557, 558, 563, 566; 704/231, 704/235, 260

See application file for complete search history.

(56) References Cited

U.S. PATENT DOCUMENTS

| 5,724,412 | A | * | 3/1998 | Srinivasan | 379/93.23 |
| 5,764,730 | A | * | 6/1998 | Rabe et al. | 455/403 |
| 5,901,214 | A | | 5/1999 | Shaffer et al. | |
| 5,930,701 | A | * | 7/1999 | Skog | 455/415 |
| 6,011,794 | A | | 1/2000 | Mordowitz et al. | |
| 6,145,083 | A | | 11/2000 | Shaffer et al. | |
| 6,185,290 | B1 | | 2/2001 | Shaffer et al. | |
| 6,266,539 | B1 | | 7/2001 | Pardo | |
| 6,320,948 | B1 | | 11/2001 | Heilmann et al. | |
| 6,381,324 | B1 | | 4/2002 | Shaffer et al. | |
| 6,385,306 | B1 | | 5/2002 | Baxter | |
| 6,459,776 | B1 | | 10/2002 | Aktas et al. | |
| 6,571,112 | B1 | * | 5/2003 | Ramaswamy | 455/466 |
| 6,574,480 | B1 | | 6/2003 | Foladare et al. | |
| 6,813,489 | B1 | * | 11/2004 | Wu et al. | 455/412.1 |
| 6,842,772 | B1 | * | 1/2005 | Delaney et al. | 709/206 |
| 6,868,268 | B1 | * | 3/2005 | Worsham et al. | 455/415 |
| 6,922,721 | B1 | * | 7/2005 | Minborg et al. | 709/219 |
| 2002/0035474 | A1 | | 3/2002 | Alpdemir | |
| 2002/0046206 | A1 | | 4/2002 | Obuchi et al. | |
| 2002/0054601 | A1 | | 5/2002 | Barraclough et al. | |
| 2002/0065828 | A1 | | 5/2002 | Goodspeed | |
| 2002/0188571 | A1 | | 12/2002 | Pilgrim | |
| 2003/0023442 | A1 | * | 1/2003 | Akabane et al. | 704/260 |
| 2003/0027565 | A1 | | 2/2003 | Bossemeyer et al. | |
| 2003/0048882 | A1 | | 3/2003 | Smith, II | |

(Continued)

Primary Examiner—Quoc Tran
(74) Attorney, Agent, or Firm—Cochran Freund & Young LLC (57) ABSTRACT Disclosed is a system for automatically accessing an account and routing speech to text converted communication to a predetermined text capable device based on user identification. A user placing a call into a communications server is automatically identified based on Caller ID. The user has an account with information unique to that user that includes text capable destinations. The user transmits a voice message to the communications server which is converted to text and automatically routed to a predetermined text capable destination, such as fax machines or email addresses, for example, based on user identification.

61 Claims, 4 Drawing Sheets

U.S. PATENT DOCUMENTS

| | | |
|---|---|---|
| 2003/0065512 A1 | 4/2003 | Walker |
| 2003/0068023 A1 | 4/2003 | Singh |
| 2003/0073434 A1 | 4/2003 | Shostak |
| 2003/0140121 A1 | 7/2003 | Adams |
| 2003/0147518 A1 | 8/2003 | Albal et al. |
| 2003/0147519 A1 | 8/2003 | Jain et al. |
| 2003/0211864 A1 | 11/2003 | Bodnar et al. |
| 2004/0209604 A1* | 10/2004 | Urban et al. ................ 455/415 |

* cited by examiner

SPEECH TO TEXT CONVERSION SYSTEM

FIELD OF THE INVENTION

The present invention relates generally to speech to text communication conversion devices using telephony systems and more particularly and without limitation to speech recognition and the use of automatic routing of text to a predetermined destination based on caller identification.

DESCRIPTION OF BACKGROUND

Automated Speech Recognition (ASR) technology has evolved continuously over the past several decades. However, error rates in a ideal system that performs conversion of human speech to digital text, or that performs recognition of discrete human speech utterances, remain fundamentally dependent upon a number of performance factors including, the desired degree of speaker independence, the desired size of the vocabulary of words or phases to be recognized, and the allowable time separation between spoken words.

In a non-ideal, physically realizable speech recognition system, further errors are introduced by equipment and processes used to capture, transmit, and process human speech include audio noise, distortion, frequency and phase response, sampling, quantization, and digital signal processing errors, transmission errors and latency introduced by a communication system used to convey speech information from the speaker to the conversion system.

The cost of speech recognition in realizable systems increases dramatically with desired performance, particularly when performance goals are high across multiple performance factors. Moreover, interactive applications requiring rapid speech recognition are more costly to implement than non-interactive applications. Realization costs are mitigated when processing time can be extended, as in non-interactive applications.

Single-speaker-dependent systems, in which training time is allowed for both phonetic recognition and for establishing personal vocabularies and word use patterns, i.e. grammar rules, can greatly reduce errors. Such system are not, however, inherently lower in cost. To the contrary, personalization of the conversion process usually entails additional hardware and software requirements.

Traditional speech recognition applications have not been broadly accepted. Directory services and customer care call centers have implemented automated speech recognition (ASR) systems using limited, pre-defined vocabularies to automate information retrieval or perform context-sensitive interactive dialog with callers over the telephone. These systems seek to perform speech recognition for any caller over a telephony connection, and do not generally perform well due to the large variations between speech patterns. Errors induced by telephony equipment and networks also contribution to the poor performance of these systems. Telephony applications of ASR are particularly challenging due to the limited sample rate and digitizing resolution of telephony CODECs (coder/decoders), and the high potential for transmission errors. Mobile telephony further introduces higher ambient noise from the use of mobile handsets.

Speaker-dependent speech recognition software is currently commercially available for free-standing computers such as desktop PCs, but such software has received only limited acceptance, mainly by handicapped individuals, specialized hands-free industrial automation and customer service applications. For the vast majority of desktop computer users, simply typing narrative information as text using a standard keyboard is far superior to ASR. Graphical user interfaces and pointing devices make the navigation and selection of context-sensitive interactive applications straight-forward as well, minimizing the need for speech recognition for selecting command options.

A rather successful, single-speaker-dependent, limited vocabulary, high word separation ASR application is available in current generation mobile telephones. Speech commands can be recognized by mobile phones that compare a prior audible entry with a current spoken entry to retrieve a specific phone number. This application has the advantages of being single speaker-dependent, using a small vocabulary and may require a relatively unnatural time separations between spoken words.

Extending the application described in current generation mobile telephones to the more general application of converting narrative natural speech to text, or reliably detecting a wide variety of context-sensitive or insensitive commands, remains very difficult to accomplish, particularly within a handheld or portable device. Conversion of natural narrative speech having very large and usually very specialized vocabularies, with short and sometimes indiscernible spoken word intervals, remains a technical challenge for even the most advanced and powerful speech recognition systems. Today, and for the foreseeable future, such natural and flexible narrative speech conversion will require, even for a single speaker-dependent system, powerful computing systems running complex software.

The pervasive availability of public wireless telephony and wireless information networks has increased the demand for, and the utility of, speech recognition functionality in handheld computing and mobile phones. Such devices are designed for real time voice communication, and for viewing digital text and graphical information such as email and web pages. However, these devices remain particularly difficult to use for the entry of text information due to the small physical size, and the context of use, which is usually in a mobile scenario, such as use while walking, driving, or traveling.

Text entry is extremely difficult in these situations. Numeric keys (0 thru 9) are tedious to use for alpha character entry. So-called qwerty keyboards, which are available in these units, are relatively small and are suitable only for limited entry of text. Handwriting recognition software using touch-screen displays has received only modest acceptance due to its poor error rate and the unnatural means required for drawing recognizable characters. Reliable speech recognition would be of great benefit to these devices. However, today, and perhaps for the foreseeable future, such devices lack the computing power to implement narrative natural speech to text conversion.

SUMMARY OF THE INVENTION

The present invention overcomes the disadvantages and limitations of the prior art by providing a telephone communications system that is capable of receiving and converting voice information to text information with a speech recognition system and automatically routing the text information to a predetermined destination based on directions initiated by Caller ID.

The present invention may therefore comprise a speech to text conversion system for converting voice information to text information for a specified user associated with a Caller ID comprising: a telephony device that transmits voice information; a telephone network that receives the voice information from the telephony device and transmits the voice information and the Caller ID to the communications server; a communications server that receives the voice information and the Caller ID; an account disposed in the communications server that is accessed by and linked to the Caller ID, the account including routing information that routes text information to a specified destination and having a speech recognition system configured specifically for the user that converts the voice information to the text information; a router disposed in the communications server that automatically transmits the text information to the specified destination.

The present invention may further comprise a method of converting voice information to text information for a specified user associated with a Caller ID comprising: transmitting voice information with a telephony device; receiving the voice information in a telephone network from the telephony device; transmitting the voice information and the Caller ID from the telephone network; receiving the voice information and the Caller ID using a communications server; accessing an account disposed in the communications server using the Caller ID; converting the voice information to the text information using a speech recognition system that is configured specifically for the specified user; routing the text information to a specified destination from routing information stored in the account; transmitting the text information from the communications server to the specified destination automatically.

These and various other features as well as advantages which characterize the present invention will be apparent upon reading of the following detailed description and review of the associated drawings.

DETAILED DESCRIPTION

Figure 1:
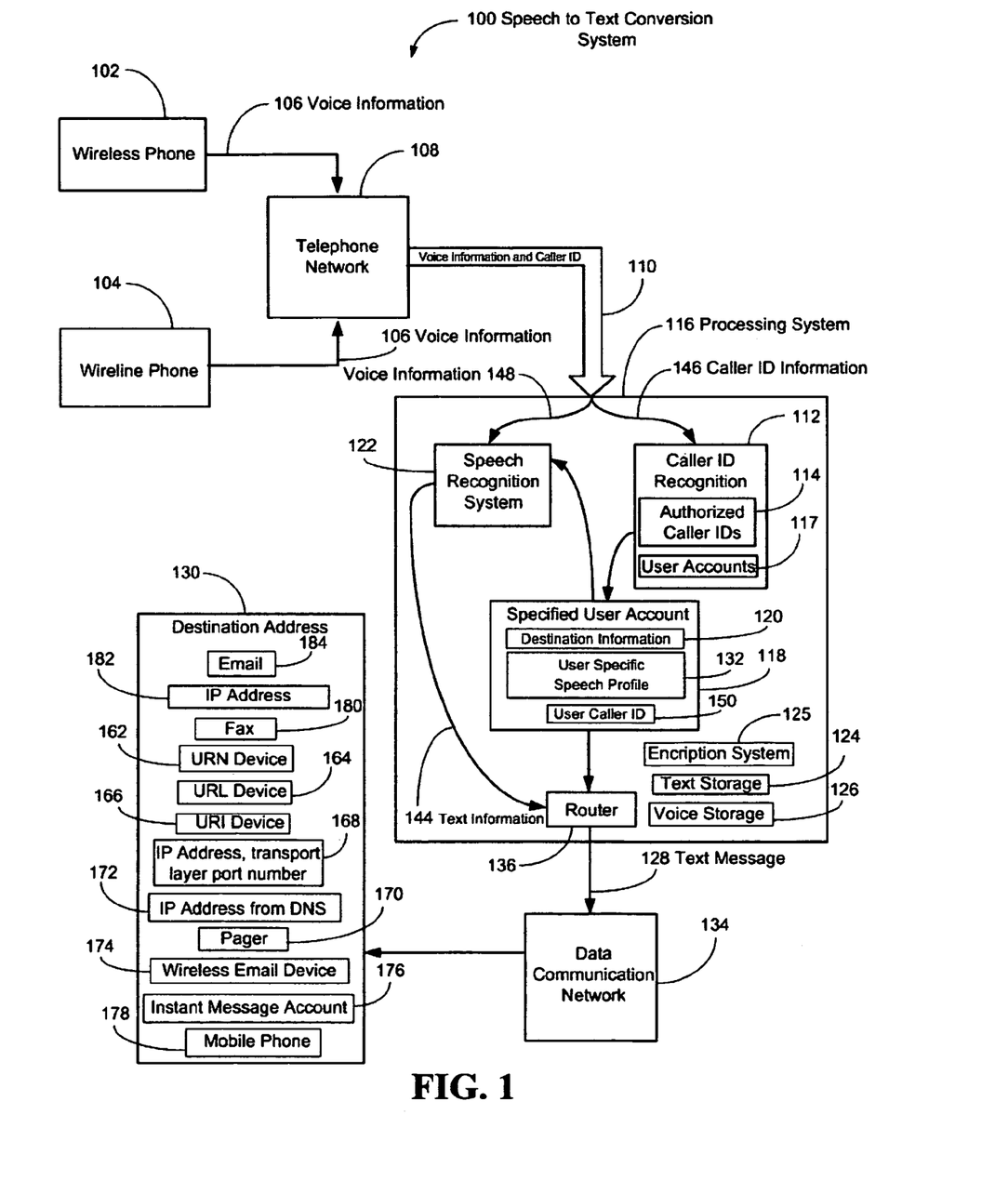
FIG. 1 is a block diagram of a speech to text conversion system with a speech to text conversion function in a processing system.

Referring to the drawings in general, and more particularly to FIG. 1, shown therein is a block diagram of an embodiment of a speech to text conversion system 100. In what follows, similar or identical structure is identified using identical callouts. The speech to text conversion system 100 includes at least one telephony device that transmits voice information and caller identification information referred to herein as "Caller ID." The telephony device may comprise a wireless phone 102 or a wireline phone 104, which transmits 106 a call, for example, by voice, or voice information, to a telephone network 108 from a user. The telephone network 108 generates a Caller ID and transmits the voice information and Caller ID 110 to a processing system 116. The processing system 116 routes the Caller ID information 146 to a Caller ID recognition system 112 containing a plurality of Caller IDs 114 authorized to use the processing system 116. Each authorized caller ID 114 has an associated user account 117 containing information such as text messaging destination information 120 and user specific speech profile information 132. When the Caller ID recognition system 112 identifies the specified user account 118, user specific speech profile information 132 is sent to the speech recognition system 122 for speech to text conversion. The text information 144 is then sent to a router 136 along with the text messaging destination information 120. The router 136 can be made up data communication routers, computing hosts, and/or application-specific servers and clients that manage and direct the text information 144 with the destination information 120. The router 136 transmits the text information 144 and the destination information 120 as a text message 128 to a data communications network 134, such as the Internet for example. The data communications network 134, in turn, sends the text message to a destination address 130 which is capable of receiving text messages.

The destination address 130 can include devices addressable utilizing an IP address 182, or a Domain Name, URI (Uniform Resource Identifier) 1624, URN (Uniform Resource Name) 162, URL (Uniform Resource Locator) 164, or functionally similar proprietary addressing scheme, for example an email 184, instant message 176 from an instant message account addressable through an instant message service with account identification, or web server. Associated devices can include wireless email devices 174, text capable devices addressable by an internet protocol address obtained from a query to a Domain Name Server (DNS) 172, and a text capable device addressable by a combination of an Internet Protocol (IP) Address and a transport layer port number 168 such as the Transport Control Protocol (TCP) port number or a Universal Datagram Protocol (UDP) port number. Destinations 130 can also include devices that can receive data over an underlying telephony connection, such as computer modems, text capable pagers 170, fax machines 180, and mobile telephones 178 having short message system support.

Figure 2:
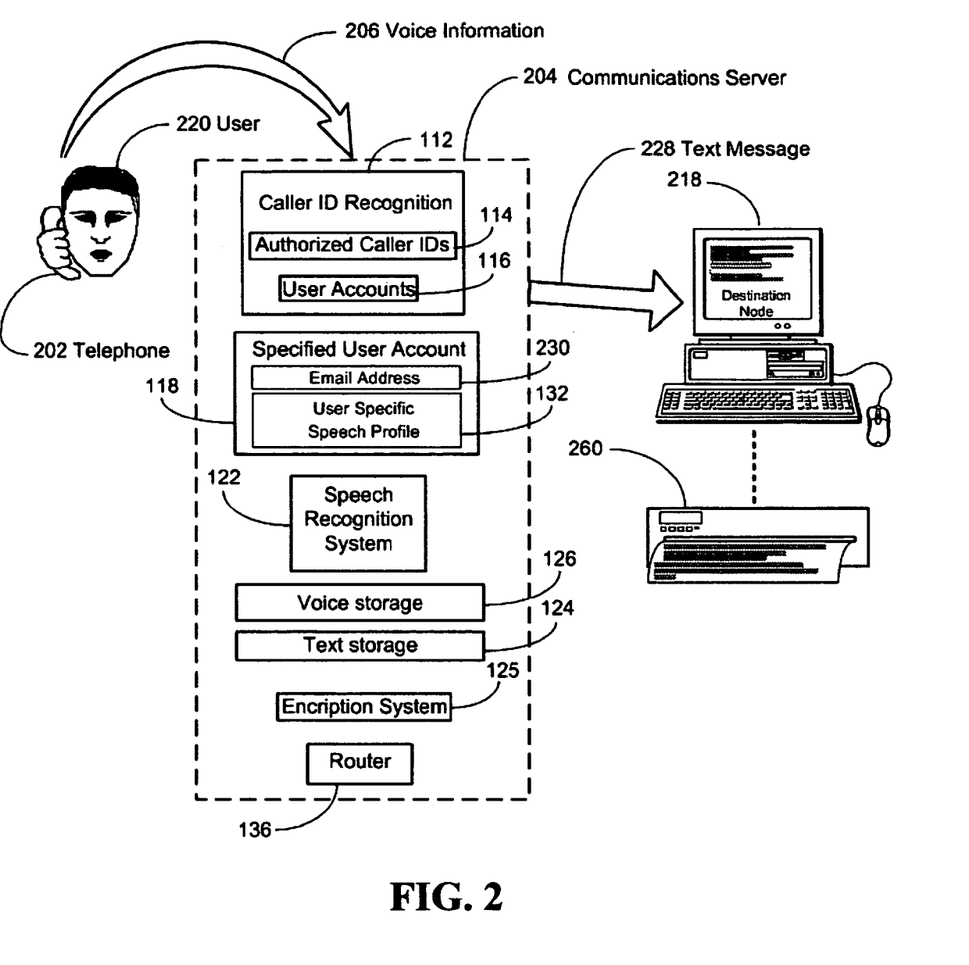
FIG. 2 is a diagrammatic view of the communications server with a user and a predetermined email and fax system capable to receiving text information.

The functions of the telephone network 108, the processing system 116, the caller ID recognition system 112, specified user account 118, speech recognition system 122 and router 136, can all be contained in a communications server 204 as shown in FIG. 2 discussed below. The communications server 204 can also contain voice storage functions 126, text storage functions 124 and encryption functions 125. As disclosed above, the communications server 204 is configured to access specified user account information 118, when the user is identified through Caller ID 112. Specific user account information can include user Caller ID 150, destination information 120 and other personal information for example.

Therefore, the general flow of the speech to text conversion system in FIG. 1 comprises the functions that can make up the communications server 204. The communications server 204 receives voice information and Caller ID 110 from the telephone network 108 generated by the user having Caller ID associated with the telephony device, such as 102 or 104. The communications server 204 authenticates the Caller ID 146 based on the authorized caller IDs 114 in the Caller ID recognition system 112 to allow full access to the communications server 204. The voice information 106 does not require authorization or authentication of Caller ID prior to the commencement of communication 106 from the user. The voice information is converted to text and then is automatically routed 128 to a device capable of receiving text information 130. This is based on destination instructions 120 located in the user account 118 that is activated by the Caller ID information 146.

The system 100 that contains all the elements described above is envisioned in one embodiment to be used with a person making a call to leave a speech to text message for later retrieval. FIG. 2 illustrates a user 220 placing a call 206 to the communications server 204 and leaving a voice message with the communications server 204 to be converted to text and routed 228 automatically to an email account 218 or a Fax machine 260 or other data capable device. The communications server 204 identifies the user 220 by comparatively matching the Caller ID from the phone 202 with the authorized Caller IDs 114 stored in the Caller ID recognition system 112. The communications server 204 uses the speech recognition system 122 with user specific 220 speech profile information 132 in order to convert any voice information 206 to text information with minimal error. In this case, the specified user account 118 includes an email address 230, or IP address, and a Fax address 260 to where the text message is to be routed 136 automatically. The sent text message 228 is not limited to the time and date of the call, the location of the call or any other information the user 220 may find important to include. Therefore, the user 220 calls 206 into the communications server 204 and leaves a voice message and hangs up, or terminates the call, and expects to retrieve the message in text form when convenient with whatever text receiving device 130, or devices, the user 220 has designated.

Figure 3:
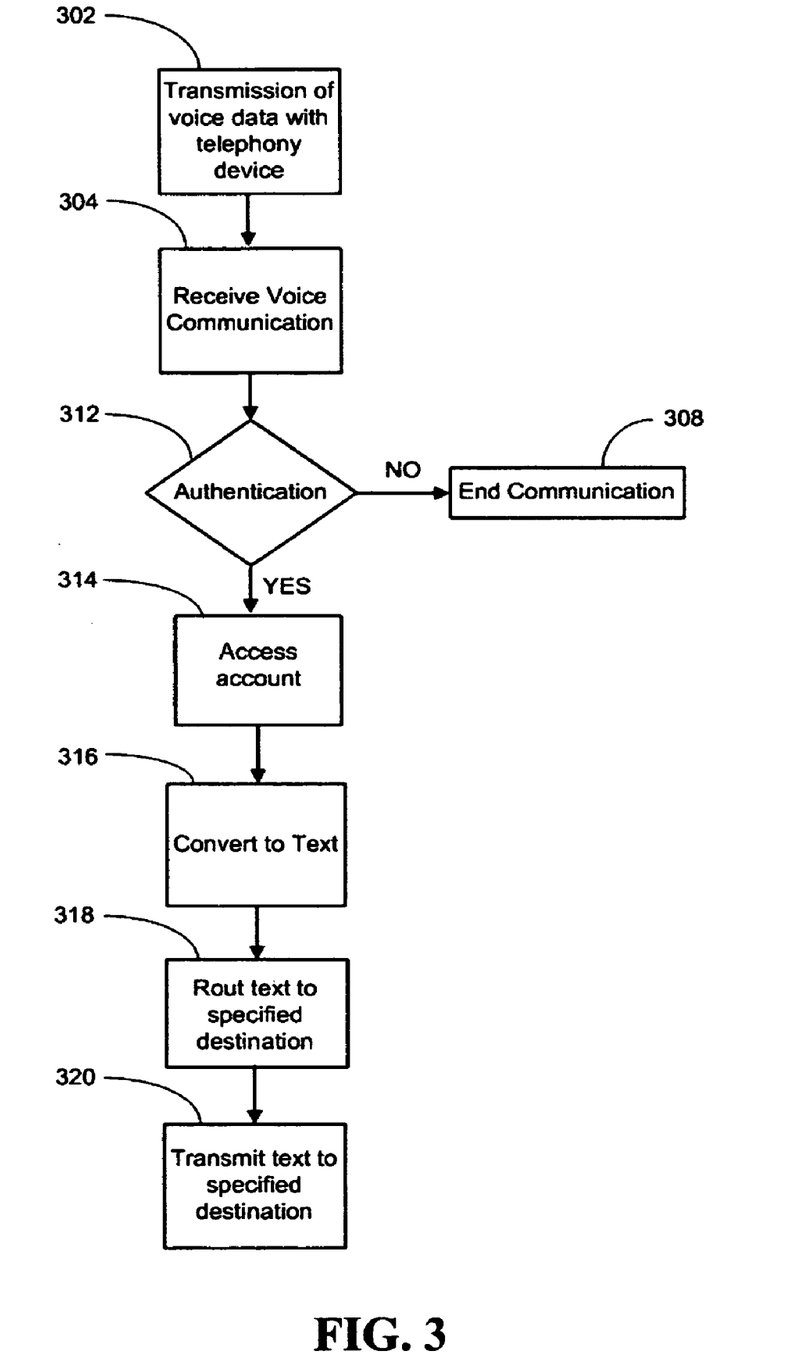
FIG. 3 is a flow chart illustrating the functions of the communications server.

FIG. 3 illustrates a method for converting voice information to text information for a specified user associated with Caller ID. Block 302 illustrates the process of transmitting voice information using a telephony device, such as from a wireless phone 102 or wireline phone 104, from a user 220. The communications server 204 receives the voice information as shown in block 304. The Caller ID associated with the telephony device is used to identify and authorize the particular user 220 to access a user account, as shown in the decision block 312. If authorization is denied because there is no Caller ID match in the communications server 204, then the communication session ends, as shown in block 308. The process of obtaining a Caller ID match could include numerous algorithms such as retry identification with a query to the telephone or user. Upon successful authorization, access to the user's account is granted, as shown in block 314. As shown at block 316, the voice information is converted to text information from a speech recognition system 122 configured specifically for the user 220. An example of a speech recognition system is the software product The Dragon Naturally Speaking software from Scansoft Corporation of Peabody, Mass. As shown at block 318, the text information is then routed to a specified destination as shown at block 318, which was previously set up by the user 220. The specified destination is derived from destination information 120 in the account 118. Block 320 illustrates the process of transmitting text information from the communications server to the specified destination, which all takes place automatically upon authorization, which is based on Caller ID, and conversion of voice information to text information 316.

The communications server 204 is also capable of storing the voice information 126 and/or the converted text 124 for later use including later authorization. The device that stores text or voice information can be a disc drive, RAID (Redundant Array of Independent Discs) system, tape drive system, or other storage system, for example. Later authorization can include a situation in which the caller 220 starts transmission 206 of a voice message while the communications server 204 is in the process of authenticating the Caller ID, as shown in block 312, or handling a call from another user.

Text messages 128 can optionally be encrypted in the Communications Server 204 prior to being sent over the data communication network 134 using an Encryption System 125, which receives the text information 144 from the speech recognition system 122, performs an encryption algorithm, and sends 128 the encrypted text information to the data communication network 134 by way of the router 136. Symmetric (secret key) encryption algorithms such as Privacy Enhanced Mail defined in Internet Engineering Task Force (IETF) RFC 1421 is commonly used to encrypt email. The encryption key can be associated with a particular destination address 120 within the user account 118.

The process of accessing account information is shown at block 314. Access to account information requires a valid Caller ID for that specific account. Authorization of the Caller ID initiates the automatic process of transmitting the text information to a predetermined device, as shown at block 320. Devices for routing destination information can include typical data communication routers and/or computing hosts supporting application-specific servers and clients for applications such as email, instant messaging, web client/server sessions, or file transfer with associated algorithms, which direct the information to addresses, or any other desired routing technique.

Referring again to FIGS. 2 and 3, voice information generated by telephony devices can be transmitted from a public, private, or virtual private telephony network, or any combination thereof. Telephony access to the communications server 204 can be provided via wireless and/or wireline telephony networks, private, virtual private, or public such as PSTN (Public Switch Telephone Network), or any combination thereof. The communications server 204 is capable of receiving calls 206 from one or more Points of Presence (PoP) enabling telephony users to access the communications server 204 using a call center model having one phone number with multiple access lines. This allows multiple users to access the communications server 204 simultaneously.

Voice information is received by a communications server 204, as disclosed above, which can perform all of the functions performed by the processing system 116, which includes the account 118, account information 120 and 132 and storage functions 124 and 126. The Caller ID recognition system 112 can use the Caller ID 146 to access and identify the proper user account 118 and to access various items of account information, such as destination information 120, for example.

In accordance with one implementation of the system illustrated in FIG. 2, Caller ID information is transmitted to the Caller ID recognition system 112, which compares the Caller ID information to a list of authorized Caller IDs using a search mechanism that searches authorized Caller IDs 114 in all user accounts 117. A relational database application and repository can be used for storing user account information in the communications server 204 for various user accounts 118, and can perform such searches quickly and efficiently. In addition, distributed database technology can support such a search across multiple communications servers 204 or processing systems 116 that are physically or logically separate.

Some important examples of types of Caller ID information, also known as Caller Line Identification outside the United States, that can be included as items of authorized Caller ID are listed below, along with a description of how these forms of Caller ID are transmitted to the communications server 204 and the types of devices and protocols that can be used to provide a Caller ID. These examples are not limiting in the scope of Caller ID.

A Calling Party Number (CPN) is transmitted to the communications server 204 using a Calling Number Delivery (CND) or Calling Name and Number Delivery (CNND) service, whenever the communications server 204 is accessed over a switched digital telephony network. CND and CNND are services of Signaling System 7 (SS7), also known as Common Channel Signaling (CCS), which controls call setup over switched digital telephony networks. SS7 Service Control Points (SCPs) are computers containing databases of telephone service accounts, along with corresponding telephone numbers, and routing details used by the SS7 network to set up calls. SCPs are used, among other things, to identify and transmit a CPN as the telephone number of the calling party to the called party. Automatic Number Identification (ANI) predates SS7 and can also be used to provide the telephone number of a calling party to the communications server 204. A CPN is a number referencing a telephone service account, rather than a physical Terminal Device. SCPs and telephony switches map, or associate, a CPN to the physical ports of access network elements, and, ultimately, to a wire pair leading to a premise where a wireline phone is located. A Caller Number Party message is a message provided by a telephone network 108 which delivers a Calling Party Number.

Mobile Telephony Networks can also transmit a CPN using proprietary signaling protocols, SS7, or variants of SS7/CCS. A Home Location Register (HLR) is a computer system containing a information base of mobile telephone service accounts, corresponding telephone numbers, corresponding ESN (Electronic Serial Number) or SIM (Subscriber Identification Module) information, and call routing information. HLRs, among other things, can map the ESN or SIM information within a mobile telephone handset to a mobile telephone account number and telephone number.

GSM, GPRS, UMTS, and W-CDMA mobile phone standards that utilize a Subscriber Identification Module (SIM) or Universal Subscriber Identification Module (USIM), which upon being installed in a mobile phone, identifies the phone with a mobile telephony account and corresponding phone number, thus allowing calls to be placed from or to the phones and causing the phone number to be transmitted as a CPN when a call is initiated from a mobile phone. SIMs and USIMs are part of a class of user identification and authentication devices which can be used for authorization purposes by the communication server.

The communications server 204 recognizes SIM or USIM identity information directly, if such information is transmitted by the mobile carrier to the communications server 204. However, the more common case will be that the mobile carrier will first map SIM or USIM identity information to a user account 118, and transmit 206 a corresponding telephone number as a CPN.

TDMA, CDMA, and CDMA2000 mobile phones utilize an Electronic Serial Number (ESN), a unique serial number of a cellular phone, which is either configured manually, automatically, or permanently by hardware, that identifies the mobile telephone handset. ESNs can be used in an identical manner as SIM and USIM information to provide various forms of Caller ID to the communications server 204, but are not portable from one mobile handset to the next.

A USIM Integrated Circuit Card (UICC) is a device similar to a USIM which includes an integrated circuit processor capable of sustaining program execution, enabling advanced mobile applications to implement enhanced security and authentication, normally in conjunction with a AAA (Authorization Authentication and Accounting) server, Digital Certificate Authority, or network-accessible Application Server. It is also part of a class of user identification and authentication devices that can be used as a Caller ID for authorization purposes.

UICCs perform all SIM and USIM functions, but additionally allow sessions to be established, or identification and authentication transactions to occur, directly between the processor on the UICC and applications resident in the handset, in the mobile network, or on any application server to which the mobile network is connected. UICCs can both identify, and to a certain degree, authenticate a user and can contain account identity information that can be directly used by the communications server 204 as a form of Caller ID.

Text information can be transmitted by the communications server 204 to various destinations utilizing various types of networks including standard network technology, such as switching devices, routing devices, controllers and transmission lines. Access points to these networks can utilize any combination of wireless or wireline LAN (Local Area Network), MAN (Metro Area Network), WAN (Wide Area Network), Dail-up Modem connection, or Broadband IP networks, which can be either private, virtual private, public, or any combination thereof. The communications server 204 is capable of including a network access point, typically a router, which can be connected to the public Internet or any private or virtual private IP backbone. All information transmitted from the communications server 204 to destination addresses 130, which can be of a variety of forms, is digital in nature and can be sent in connectionless data gram transport mode, or via connection-oriented transport. As previously disclosed, destinations 130 can include devices addressable utilizing an (IP) address 182, or a Domain Name, URI (Uniform Resource Identifier) 1624, URN (Uniform Resource Name) 162, URL (Uniform Resource Locator) 164, or functionally similar proprietary addressing scheme, for example an email 184, instant message 176 from an instant message account addressable through an instant message service with account identification, or web server. Associated devices can include wireless email devices 174, text capable devices addressable by an internet protocol address obtained from a query to a Domain Name Server (DNS) 172, and a text capable device addressable by a combination of an Internet Protocol (IP) Address and a transport layer port number such as the Transport Control Protocol (TCP) port number or a Universal Datagram Protocol (UDP) port number 168. Destinations 130 can also include devices that can receive data over an underlying telephony connection, such as computer modems, text capable pagers 170, fax machines 180, and mobile telephones 178 having short message system support, or to servers having accounts 118, where the user 220 can then retrieve the record by accessing the server account 118.

Figure 4:
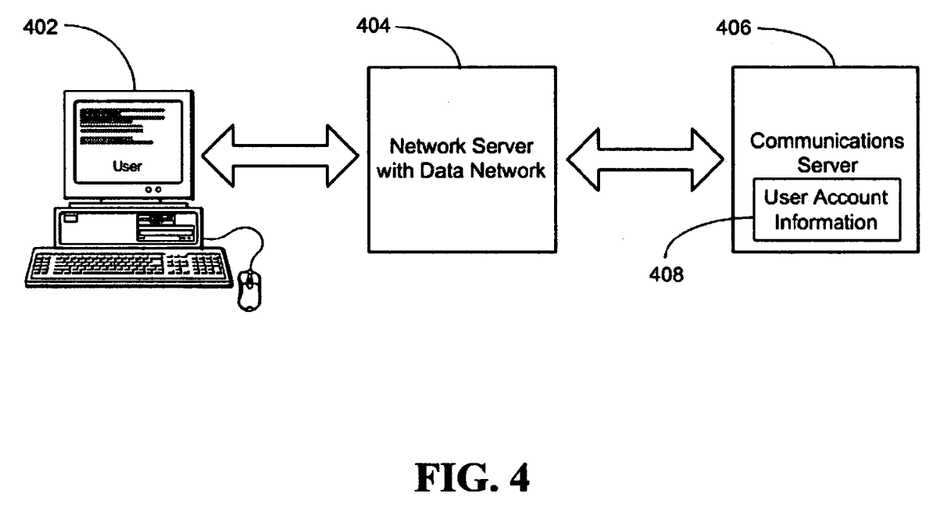
FIG. 4 is a diagrammatic view of the communications server accessed and managed independently and separately from the process of sending voice information.

FIG. 4 illustrates how a user can access, set up or change information specific to the user 408 retained by the communications server 406. Account information 408 can be accessed and managed independently and separately from the process of sending voice information 206, using a separate network server 404 connected to a public or private information network, for example the Internet or a virtual private IP network. The network server 404 could be a web server, supporting HTTP(S) or WAP protocols, with access being through a web browser client application on a suitable Terminal Device such as a handheld, portable, or static computer. Security protocols can be optionally implemented to ensure authentication and privacy. In this example, the user 402 can access user information 408, such as account information, with a computer system 402 on-line, or through the network server with data network capabilities 404. Accessing the communications server 406 could also be done by automation over a telephony device or by calling and communicating with a human representative. The user 402 can leave instructions to initiate or change Caller ID, speech information or text message destinations 130 capable of receiving text information. Destinations could be, for example, in the form of a fax machine, a pager, an IP address, an email address, just to name a few. This server need not be physically located in the same facility as the elements that need to handle the conversion of voice information to text.

The present invention therefore provides a method and apparatus for accessing an account with Caller ID. The account contains a speech recognition system associated with a user and automatic routing information for routing text messages to a predetermined location capable of receiving text information. The present invention eliminates timely user interaction due to manual input for information handling with a communications server. The present invention utilizes a simple Caller ID to automatically access a speech recognition system that converts a voice message to text and sends the text information to a predetermined location capable of receiving the text information.

The foregoing description of the invention has been presented for purposes of illustration and description. It is not intended to be exhaustive or to limit the invention to the precise form disclosed, and other modifications may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A speech to text conversion system for converting voice information to text information for a specified user associated with a Caller ID comprising:
   a telephony device that transmits said voice information;
   a telephone network that receives said voice information from said telephony device and transmits said voice information and said Caller ID to said communications server;
   a communications server that receives said voice information and said Caller ID;
   an account disposed in said communications server that is accessed by and linked to said Caller ID, said account including routing information that routes text information to a specified destination and having a speech recognition system configured specifically for said user that converts said voice information to said text information; and
   a router disposed in said communications server that automatically transmits said text information to said specified destination.

2. The speech to text conversion system of claim 1 Wherein said communications server further comprises a storage device that stores said voice information.

3. The speech to text conversion system of claim 1 wherein said communications server further comprises a storage device that stores said text information.

4. The speech to text conversion system of claim 1 wherein said Caller ID is an Automatic Number Identifier.

5. The speech to text conversion system of claim 1 wherein said Caller ID is a Calling Party Number.

6. The speech to text conversion system of claim 1 wherein said Caller ID is a Calling Number Delivery.

7. The speech to text conversion system of claim 1 wherein said Caller ID is a Calling Name and Number Delivery.

8. The speech to text conversion system of claim 1 wherein said Caller ID is a Caller Line Identification.

9. The speech to text conversion system of claim 1 wherein said Caller ID is a Calling Party Number Message.

10. The speech to text conversion system of claim 1 wherein said Caller ID is an Electronic Serial Number from a wireless telephony device.

11. The speech to text conversion system of claim 1 wherein said Caller ID is information stored within a Subscriber Identification Module which is installed in a wireless telephony device.

12. The speech to text conversion system of claim 1 wherein said Caller ID is information stored within a Universal Subscriber Identify Module which is installed in a wireless telephony device.

13. The speech to text conversion system of claim 1 wherein said Caller ID is information stored within a Universal Subscriber Identify Module Integrated Circuit Card which is installed in a wireless telephony device.

14. The speech to text conversion system of claim 1 wherein said text information is encrypted prior to being transmitted to said specified destination.

15. The speech to text conversion system of claim 1 wherein said specified destination is text capable device addressable by an email address.

16. The speech to text conversion system of claim 1 wherein said specified destination is a text capable mobile telephone.

17. The speech to text conversion system of claim 1 wherein said specified destination is an Instant Message Account addressable through an Instant Message Service with an account ID.

18. The speech to text conversion system of claim 1 wherein said specified destination is a text capable pager.

19. The speech to text conversion system of claim 1 wherein said specified destination is a wireless email device.

20. The speech to text conversion system of claim 1 wherein said specified destination is a text capable device addressable by an Internet Protocol Address.

21. The speech to text conversion system of claim 1 wherein said specified destination is a text capable device addressable by an Internet Protocol Address obtained from a query to a Domain Name Service.

22. The speech to text conversion system of claim 1 wherein said specified destination comprises a text capable device addressable by an Internet Protocol Address and a transport layer port number.

23. The speech to text conversion system of claim 1 wherein said specified destination is a text capable device addressable by a Uniform Resource Identifier.

24. The speech to text conversion system of claim 1 wherein said specified destination is a text capable device addressable by a Uniform Resource Locator.

25. The speech to text conversion system of claim 1 wherein said specified destination is a text capable device addressable by a Uniform Resource Name.

26. The speech to text conversion system of claim 1 wherein said specified destination is a fax machine.

27. The speech to text conversion system of claim 1 wherein said telephony device is a wireless telephony device.

28. The speech to text conversion system of claim 1 wherein said telephony device is a wireline telephony device.

29. A speech to text conversion system for converting voice information to text information for a specified user associated with Caller ID comprising:

means for generating voice information;
means for generating said Caller ID;
communications server means for receiving said voice information and said Caller ID;
means for accessing an account disposed in said communications server means based on said Caller ID;
means for directing text information to a specified destination based on destination information accessed in said account;
means for converting said voice information to said text information that is configured specifically for said user that is accessed using said information stored in said account; and
means for transmitting said text information to said specified destination automatically.

30. The speech to text conversion system of claim 29 further comprising telephone network means for receiving said voice information from said means for generating voice information.

31. The telephone network means of claim 30 further comprising means for transmitting said voice information and said Caller ID to said communications server.

32. The speech to text conversion system of claim 29 wherein said communications server means further comprises means for storing said voice information.

33. The speech to text conversion system of claim 29 wherein said communications server means further comprises means for storing said text information.

34. A method for converting voice information to text information for a specified user associated with a Caller ID comprising:
transmitting voice information with a telephony device;
receiving said voice information in a telephone network from said telephony device;
transmitting said voice information and said Caller ID from said telephone network;
receiving said voice information and said Caller ID using a communications server;
accessing an account disposed in said communications server using said Caller ID;
converting said voice information to said text information using a speech recognition system that is configured specifically for said specified user;
routing said text information to a specified destination from routing information stored in said account; and
transmitting said text information from said communications server to said specified destination automatically.

35. The method of claim 34 further comprising storing said voice information at said communications server.

36. The method of claim 34 further comprising storing said text information at said communications server.

37. The method of claim 34 further comprising encrypting said text information prior to transmitting said text information from said communications server to said specified destination.

38. The method of claim 34 wherein the step of routing said text information comprises routing said text information to a text capable device addressable by an email address.

39. The method of claim 34 wherein the step of routing said text information comprises routing said text information to a text capable mobile telephone.

40. The method of claim 34 wherein the step of routing said text information comprises routing said text information to an Instant Message Account addressable through an Instant Message Service with an account ID.

41. The method of claim 34 wherein the step of routing said text information comprises routing said text information to a text capable pager.

42. The method of claim 34 wherein the step of routing said text information comprises routing said text information to a wireless email device.

43. The method of claim 34 wherein the step of routing said text information comprises routing said text information to a text capable device addressable by an Internet Protocol Address.

44. The method of claim 34 wherein the step of routing said text information comprises routing said text information to a text capable device addressable by an Internet Protocol Address obtained from a query to a Domain Name Service.

45. The method of claim 34 wherein the step of routing said text information comprises routing said text information to a text capable device addressable by an Internet Protocol Address and a transport layer port number.

46. The method of claim 34 wherein the step of routing said text information comprises routing said text information to a text capable device addressable by a text capable device addressable by a Uniform Resource Identifier.

47. The method of claim 34 wherein the step of routing said text information comprises routing said text information to a text capable device addressable by a Uniform Resource Locator.

48. The method of claim 34 wherein the step of routing said text information comprises routing said text information to a text capable device addressable by a Uniform Resource Name.

49. The method of claim 34 wherein the step of routing said text information comprises routing said text information to a fax machine.

50. The method of claim 34 wherein the step of routing said text information comprises routing said text information to a wireless telephony device.

51. The method of claim 34 wherein the step of routing said text information comprises routing said text information to a wireline telephony device.

52. The method of claim 34 further comprising the step of providing said Caller ID by using an Automatic Number Identifier.

53. The method of claim 34 further comprising the step of providing said Caller ID by using a Calling Party Number.

54. The method of claim 34 further comprising the step of providing said Caller ID by using a Calling Number Delivery.

55. The method of claim 34 further comprising the step of providing said Caller ID by using a Calling Name and Number Delivery.

56. The method of claim 34 further comprising the step of providing said Caller ID by using a Caller Line Identification.

57. The method of claim 34 further comprising the step of providing said Caller ID by using a Party Number Message.

58. The method of claim 34 further comprising the step of providing said Caller ID by using an Electronic Serial Number from a wireless telephony device.

59. The method of claim 34 further comprising the step of providing said Caller ID by using information stored within a Subscriber Identification Module which is installed in a wireless telephony device.

60. The method of claim 34 further comprising the step of providing said Caller ID by using information stored within a Universal Subscriber Identify Module which is installed in a wireless telephony device.

61. The method of claim 34 further comprising the step of providing said Caller ID by using information stored within a Universal Subscriber Identify Module Integrated Circuit Card which is installed in a wireless telephony device.

* * * * *